(12) United States Patent
Li et al.

(10) Patent No.: US 6,355,156 B1
(45) Date of Patent: Mar. 12, 2002

(54) METHOD OF MONITORING ELECTROCHEMICAL MACHINING PROCESS AND TOOL ASSEMBLY THEREFOR

(75) Inventors: Wei Li, Niskayuna; Bin Wei, Clifton Park, both of NY (US); Michael Scott Lamphere, Manchester, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/672,488

(22) Filed: Sep. 29, 2000

(51) Int. Cl.[7] .................................................. B23H 3/00
(52) U.S. Cl. ...................... 205/645; 205/652; 205/668; 204/224 M; 204/222
(58) Field of Search ............................ 204/224 M, 222; 205/645, 652, 668

(56) References Cited

U.S. PATENT DOCUMENTS 5,672,263 A   9/1997  Raulerson et al. .......... 205/641

*Primary Examiner*—Kathryn Gorgos
*Assistant Examiner*—Thomas H Parsons
(74) *Attorney, Agent, or Firm*—Patrick K. Patnode; Christian G. Cabou

(57) ABSTRACT

An electrochemical machining process is monitored by embedding an ultrasonic sensor in an electrochemical machining tool to provide a tool assembly, placing the tool assembly in a spatial relationship with a workpiece, disposing an electrolytic fluid at least in a gap between the tool and the workpiece, connecting the tool and the workpiece to an electrical power source, generating an acoustic wave from the ultrasonic sensor to propagate through the electrolytic fluid to the workpiece and reflect back from the workpiece, and, based on the propagation and reception of the acoustic wave, calculating measurement of at least the size of the gap or the thickness of the workpiece.

12 Claims, 1 Drawing Sheet

METHOD OF MONITORING ELECTROCHEMICAL MACHINING PROCESS AND TOOL ASSEMBLY THEREFOR

BACKGROUND OF THE INVENTION

This invention relates to the process of electrochemical machining and, more particularly, concerns a method of monitoring an electrochemical machining process and a tool assembly therefor.

Electrochemical machining (ECM) is a non-mechanical process in which the tool never comes in contact with the workpiece during the machining process. The tool as a cathode and the workpiece as an anode are connected to an electrical power source. A gap that exists between the tool and the workpiece is filled with a pressurized, flowing, aqueous electrolyte. ECM is generally the reverse of electroplating. The flowing electrolyte, acting as an electrical current carrier, removes metal ions from the anodic workpiece and carries them away via the gap. The gap ranges in size from 0.1 millimeters to several millimeters. The tool is typically made of brass, bronze or stainless steel. The electrolyte is a highly conductive inorganic salt solution, such as sodium nitrate. A cavity which is produced in the anodic workpiece is a female mating image of the cathodic tool.

Given a tooling geometry, dimensional accuracy of the workpiece is primarily determined by the gap distribution. The gap size should be maintained at a proper range. Too small a gap, such as less than 100 micrometers in a standard ECM operation, would lead to arcing or short-circuiting between the tool and the workpiece. Too large a gap would lead to excessive gap variation as well as reduction in the machining rate. Monitoring and controlling the gap size between the tool and the workpiece, or directly monitoring the workpiece thickness, is important for ECM tolerance control. For example, in machining a turbine compressor blade, the blade thickness should be directly measured during machining so that a desired thickness can be obtained.

Lack of suitable means for sensing gap size or workpiece thickness may hinder ECM accuracy control. Without such means, many rounds of costly trial-and-error experiments must be run to obtain the gap size changes that occur during the machining process. Gap size can change significantly during the machining process, partly because conductivity of the electrolyte may change in the gap due to Joule heating or gas bubble generation on the tool surface. Variation and inaccuracy in tool feed rate and tool positioning can also contribute to changes in gap size and workpiece thickness. In-process gap detection or workpiece thickness detection is thus important for improving ECM process control.

Several types of ECM sensors have been developed over the years since ECM came to industrial uses four decades ago. An eddy current ECM gap sensor was reported in *Annuals of the CIRP* (1982, Vol. 37/1, pp.115–118, by C. Bignon). An ECM control method using an ultrasound sensor is described in U.S. Pat. No. 5,672,263 to Raulerson et al. and is used for ECM of a large casing. However, the Raulerson et al. method is limited to applications which have a large space for housing the sensor and storing the fluid through which the ultrasonic wave propagates. By way of example, the Raulerson et al. method cannot be applied to the ECM of turbine compressor airfoils because space is limited in the machining area and also because the airfoil is surrounded by cathodes that make it impossible to directly measure airfoil thickness. The Raulerson et al. method also does not measure the gap size and is intended only to measure the workpiece thickness that is near a wide open space. Consequently, need remains for a method of monitoring an ECM process which overcomes the aforementioned limitations of the prior art without introducing any new problems.

BRIEF SUMMARY OF THE INVENTION

Monitoring an electrochemical machining process and a tool assembly therefor is achieved by embedding an ultrasonic sensor in the ECM tooling assembly. Measurement of both the gap size and workpiece thickness is performed using ultrasonic signals and is not limited by the amount of space in the machining area and is particularly applicable to the ECM of turbine compressor airfoils.

In a preferred embodiment of the invention, a method of monitoring an electrochemical machining process comprises the steps of: embedding an ultrasonic sensor in an electrochemical machining tool to provide a tool assembly; providing the tool assembly in a spatial relationship with a workpiece; flowing an electrolytic fluid at least between the tool and the workpiece; connecting the tool and the workpiece to an electrical power source; generating an acoustic wave from the ultrasonic sensor so as to propagate from the tool through the electrolytic fluid to the workpiece; receiving reflections of the acoustic wave from the workpiece; and, based on the propagated acoustic wave and the reflections thereof, calculating measurement of at least one of (a) the size of a gap between a cutting surface of the tool and a first working surface of the workpiece facing the cutting surface of the tool and (b) the thickness of the workpiece between the first working surface of the workpiece and a second working surface thereof facing away from the first working surface. The method also comprises the step of applying an acoustic couplant between the ultrasonic sensor and the tool.

More particularly, the receiving step includes reflecting a first part of the acoustic wave at the cutting surface of the tool and returning it to the ultrasonic sensor at a first arrival time, and reflecting a second part of the acoustic wave at the first working surface of the workpiece and returning it to the ultrasonic sensor at a second arrival time. The calculating step includes subtracting the first arrival time from the second arrival time, multiplying the difference by the velocity of the acoustic wave in the electrolytic fluid, and dividing the product by a factor of 2 to obtain the gap size between the cutting surface of the tool and the first working surface of the workpiece.

The receiving step also includes reflecting a first part of the acoustic wave at the first working surface of the workpiece and returning it to the ultrasonic sensor at a third arrival time, and reflecting a second part of the acoustic wave at the second working surface of the workpiece and returning it to the ultrasonic sensor at a fourth arrival time. The calculating step includes subtracting the third arrival time from the fourth arrival time, multiplying the difference by the velocity of the acoustic wave in the electrolytic fluid, and dividing the product by a factor of 2 to obtain the thickness of the workpiece between the first and second working surfaces of the workpiece.

In another exemplary embodiment of the invention, an electrochemical machining tool assembly is provided which comprises: an electrochemical machining tool positionable in a spatial relationship with respect to a workpiece and positionable in contact with an electrolytic fluid disposed at least in a gap between the tool and the workpiece, the tool having a cutting surface facing the workpiece; and an ultrasonic sensor embedded in the tool for generating an acoustic wave that propagates from the tool through the electrolytic fluid to the workpiece and is reflected back to the ultrasonic sensor for use in calculating a measurement of at least one of (a) the size of the gap between the cutting surface of the tool and a first working surface of the workpiece facing the cutting surface of the tool and (b) the thickness of the workpiece between the first working surface of the workpiece and a second working surface of the workpiece facing away from the first working surface of the workpiece. The assembly also comprises an acoustic couplant applied between the ultrasonic sensor and the tool.

DETAILED DESCRIPTION OF THE INVENTION

Figure 1:
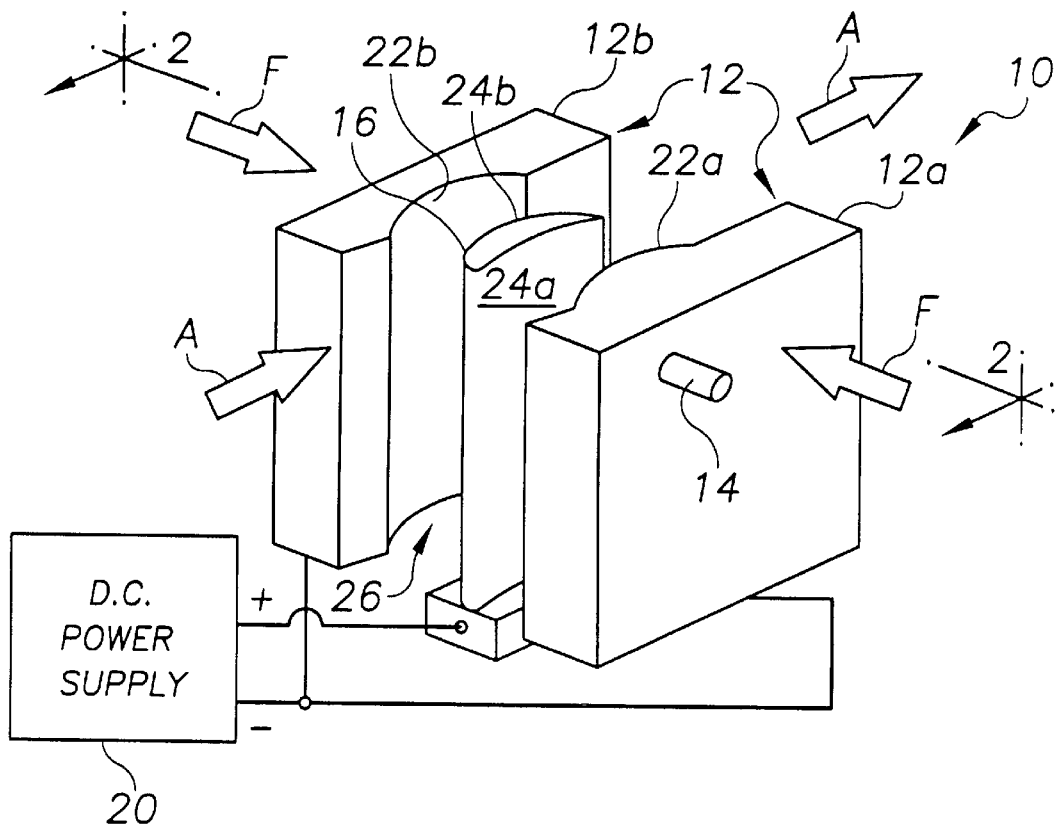
FIG. 1 is a perspective view of an electrochemical machining tool assembly of the invention, used in monitoring an electrochemical machining process.
Figure 2:
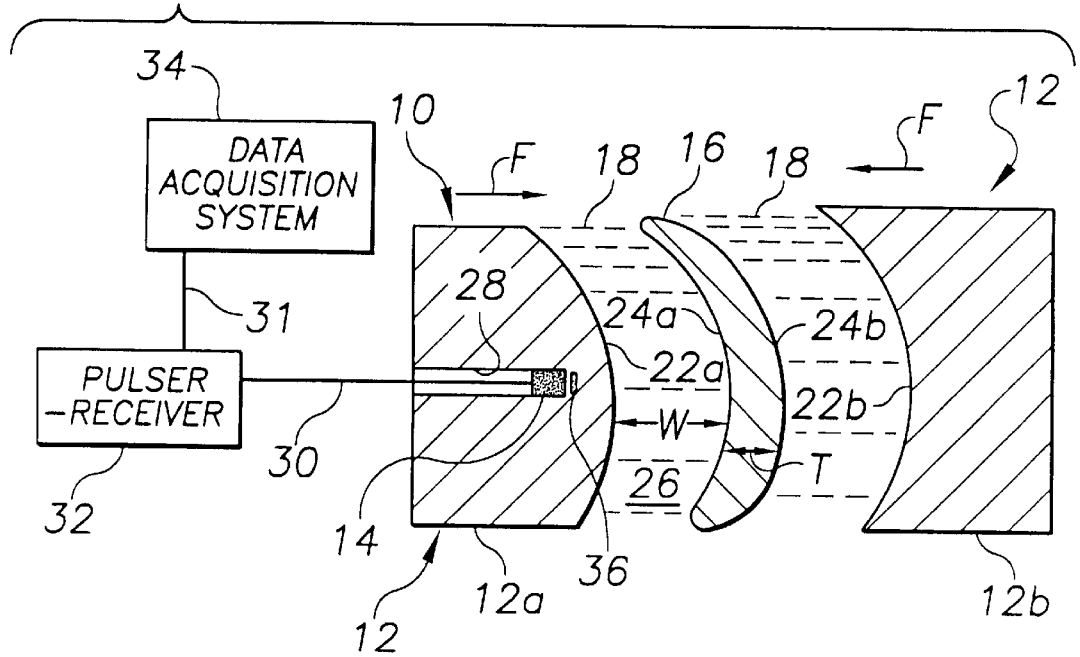
FIG. 2 is a sectional view taken along line 2—2 of the electrochemical machining tool assembly of FIG. 1.

FIGS. 1 and 2 illustrate an electrochemical machining tool assembly 10 of the invention, as used in a conventional electrochemical machining process and in a method of the invention for monitoring the electrochemical machining process. The tool assembly 10 basically includes an electrochemical machining tool 12 and an ultrasonic sensor 14. Tool 12 and sensor 14 are used in conjunction with a workpiece 16, an electrolytic fluid 18 and a DC power supply 20.

Electrochemical machining tool 12 has a suitable configuration to electrochemically machine workpiece 16 into the desired configuration. Tool 12 has at least a first cutting surface 22a and, more particularly, where workpiece 16 is to be machined on opposite sides, tool 12 has two parts 12a, 12b with first and second cutting surfaces 22a, 22b of the desired configuration thereon facing toward workpiece 16 for machining first and second working surfaces 24a, 24b of complementary shapes to first and second cutting surfaces 22a, 22b. The two parts 12a, 12b of tool 12 are mounted in any suitable manner on opposite sides of workpiece 16 so as to be movable toward and away from workpiece 16 in setting up tool 12 for, and adjusting tool 12 during, the machining process. By way of example, where workpiece 16 is a turbine blade, the first cutting surface 22a has a substantially convex configuration for machining a first working surface 24a of a substantially concave configuration and the second cutting surface 22b has a substantially concave configuration for machining a second working surface 24b of a substantially convex configuration.

Electrochemical machining tool 12 is positionable in a desired spatial relationship with respect to workpiece 16. Workpiece 16 may be disposed adjacent to and spaced from first cutting surface 22a or between first and second cutting surfaces 22a, 22b of tool 12 such that a gap 26 is provided therebetween. Each of cutting surfaces 22a, 22b faces toward one of the first and second working surfaces 24a, 24b of workpiece 16 across gap 26.

Tool assembly 10 and workpiece 16 are disposed in a receptacle (not shown) which also contains electrolytic fluid 18 disposed at least in gap 26 between tool 12 and workpiece 16. Electrolytic fluid 18 may immerse portions, or all, of each of electrochemical machining tool 12 and workpiece 16. Suitable known means, such as a pump system (not shown), is connected to the receptacle to cause electrolytic fluid 18 to flow in the direction of the arrows A and recirculate through gap 26 past tool 12 and workpiece 16. Tool 12 is connected to a negative (−) terminal of D.C. power source 20 so as to function as a cathode and workpiece 16 is connected to a positive (+) terminal of D.C. power source 20 so as to function as an anode. Consequently, conventional electrical current flows from first and second working surfaces 24a, 24b of workpiece 16 through electrolytic fluid 18 to first and second cutting surfaces 22a, 22b of tool 12. The flow of electrolytic fluid 18 prevents material removed from workpiece 16 from being deposited on tool 12.

Ultrasonic sensor 14 is embedded in a recess 28 in the one part 12a of electrochemical machining tool 12. Electrical cable 30 is connected to sensor 14 and extends from recess 28 for connection to a pulser-receiver device 32, and electrical cable 31 connects pulser-receiver device 32 to a data acquisition system 34, for controlling operation of sensor 14 and making the necessary calculations for providing the measurements of the width W of gap 26 and the thickness T of workpiece 16. Sensor 14 generates an ultrasonic wave that is used to measure at least one of the width W of gap 26 or the thickness T of workpiece 16. Recess 28 and thus ultrasonic sensor 14 can be disposed at any suitable location on tool 12. As one example, sensor 14 is disposed adjacent to first cutting surface 22a of the one part 12A of tool 12 such that the axis of sensor 14 is substantially normal to first cutting surfaces 22a and coincident with the feed of the tool parts 12a, 12b in the direction of arrows F or forms the smallest angle therewith as compared to angles from other locations. Sensor 14 can be any suitable type, such as a contact or an immersion transducer.

Sensor 14 generates the acoustic wave so as to propagate from tool 12 through electrolytic fluid 18 to workpiece 16 and reflect back to sensor 14 where it is received and used to calculate the measurement of the at least one of the width W of gap 26 between first cutting surface 22a of tool 12 and first working surface 24a of workpiece 16 facing first cutting surface 22a of tool 12 and of the thickness T of workpiece 16 between first and second working surfaces 24a, 24b thereof.

If the width W of gap 26 is to be determined, a first part of the acoustic wave of ultrasonic sensor 14 is reflected at first cutting surface 22a of part 12a of tool 12 and returns to ultrasonic sensor 14 at a first arrival time, and a second part of the acoustic wave of ultrasonic sensor is reflected at first working surface 24a of workpiece 16 and returns to ultrasonic sensor 14 at a second arrival time. These arrival times are calculated by data acquisition system 34, and a measurement of the distance across, or the width, of gap 26 between first cutting surface 22a of tool 12 and first working surface 24a of workpiece 16 is calculated by data acquisition system 34 by subtracting the first arrival time from the second arrival time and multiplying the difference by the velocity of the acoustic wave in electrolytic fluid 18 and div dividing the product by a factor of 2.

If the thickness T of workpiece 16 is to be determined, a first part of the acoustic wave of ultrasonic sensor 14 is reflected at first working surface 24a of workpiece 16 and returns to ultrasonic sensor 14 at a first arrival time and a second part of the acoustic wave of ultrasonic sensor 14 is reflected at second working surface 24b of workpiece 16 and returns to ultrasonic sensor 14 at a second arrival time. These arrival times are calculated by data acquisition system 34 and a measurement of the thickness T of workpiece 16 between first and second working surfaces 24a, 24b of workpiece 16 is calculated by subtracting the first arrival time from the second arrival time and multiplying the difference by the velocity of the acoustic wave in the electrolytic fluid 18 and dividing the product by a factor of 2.

Tool assembly 10 also includes an acoustic couplant 36 which is applied in a recess 28 between ultrasonic sensor 14 and the one part 12a of tool 12. The acoustic wave of ultrasonic sensor 14 passes through acoustic couplant 36 and transmits through tool 12 before passing into electrolytic fluid 18 and through workpiece 16. Oil is used as acoustic couplant 36 if ultrasonic sensor 14 is a contact transducer. For measurements through smooth surfaces, oil having a lower viscosity is used. For measurements through rough surfaces, oil having a higher viscosity is used. Acoustic couplant 36 is aqueous if ultrasonic sensor 14 is an immersion transducer.

A large variety of contact transducers and immersion transducers can be used as ultrasonic sensor 14, depending upon the specific part surface condition and applications, such as the ranges of the gap sizes and the workpiece thicknesses to be measured. Generally, ultrasonic measurement is capable of resolving a gap 26 size of 0.1 millimeter. The applicable spatial resolution of the ultrasonic measurements can range from 1.0 millimeter to 20 millimeters or can have an even broader range depending upon the type of transducer chosen or depending upon the factors of frequency, size, focal length, etc. Local information on the gap size and workpiece thickness can be obtained if a focus-type transducer is used. The measured quantities reflect the averaged properties over the sensor surface area if a planar-type transducer is used. The acoustic wave velocity in electrolytic fluid 18 can vary due to changes in density of the electrolytic fluid. The density of electrolytic fluid 18, however, reaches a constant value after a certain duration of machining and so the acoustic wave velocity can be considered constant. The acoustic wave velocity can be calibrated using a known gap size or a known workpiece thickness. During the electrochemical machining process, gas bubbles are usually generated at cutting surfaces 22 of electrochemical machining tool 12. The gas bubbles may cause ultrasonic acoustic wave attenuation. D.C. power supply 20 may be turned off for a brief period of time, such as for the time interval used in pulsed electrochemical machining, or the voltage of D.C. power supply 20 may be reduced so as to minimize the generation of gas bubbles in order for a more accurate measurement to be made. Insulation of the ultrasonic sensor 14 casing might also be used.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method of monitoring an electrochemical machining process, comprising the steps of:
    embedding an ultrasonic sensor in an electrochemical machining tool to provide a tool assembly;
    situating the tool assembly in a spatial relationship with a workpiece;
    flowing an electrolytic fluid at least between the tool and the workpiece;
    connecting the tool and the workpiece to a source of electrical power;
    generating an acoustic wave from the ultrasonic sensor so as to propagate from the tool through the electrolytic fluid to the workpiece;
    receiving reflections of the acoustic wave from the workpiece; and
    based on the propagated acoustic wave and the reflections thereof, calculating measurement of at least one of a group consisting of (a) size of a gap between a cutting surface of the tool and a first working surface of the workpiece facing the cutting surface and (b) thickness of the workpiece between the first working surface of the workpiece and a second working surface thereof facing away from the first working surface.

2. The method of claim 1 in which the receiving step includes:
    reflecting a first part of the acoustic wave from the cutting surface of the electrochemical machining tool and returning said first part to the ultrasonic sensor at a first arrival time; and
    reflecting a second part of the acoustic wave from the first working surface of the workpiece and returning the second part of the acoustic wave to the sensor at a second arrival time.

3. The method of claim 2 in which the calculating measurement step includes subtracting the first arrival time from the second arrival time to determine any difference therebetween, multiplying the difference by velocity of the acoustic wave in the electrolytic fluid, and dividing the product of the multiplication by a factor of 2 to obtain the gap size between the cutting surface of the tool and the first working surface of the workpiece.

4. The method of claim 1 in which the receiving step includes:
    reflecting a first part of the acoustic wave from the first working surface of the workpiece and returning said first part to the ultrasonic sensor at a first arrival time; and
    reflecting a second part of the acoustic wave from the second working surface of the workpiece and returning said second part to the ultrasonic sensor at a second arrival time.

5. The method of claim 4 in which the calculating measurement step includes subtracting the first arrival time from the second arrival time to determine any difference therebetween, multiplying the difference by velocity of the acoustic wave in the electrolytic fluid, and dividing the product of the multiplication by a factor of 2 to obtain the thickness of the workpiece between the first and second working surfaces of the workpiece.

6. The method of claim 1 further comprising the step of:
    applying an acoustic couplant between the ultrasonic sensor and the electrochemical machining tool.

7. The method of claim 1 in which the connecting step includes disconnecting the tool and the workpiece from the source of electrical power for a predetermined period of time so as to minimize production of gas bubbles generated during the electrochemical machining process when calculating measurement of at least one of the group consisting of the gap size and the workpiece thickness.

8. The method of claim 1 in which the connecting step includes reducing voltage of the electrical power supplied to the tool and the workpiece for a predetermined period of time so as to minimize production of gas bubbles generated during the electrochemical matching process when calculating measurement of at least one of the group consisting of the gap size and the workpiece thickness.

9. An electrochemical machining tool assembly, comprising:
    an electrochemical machining tool positionable in a spatial relationship with respect to a workpiece and positionable in contact with an electrolytic fluid disposed at least in a gap between said tool and the workpiece, said tool having a cutting surface facing the workpiece; and an ultrasonic sensor embedded in said tool for generating an acoustic wave from said ultrasonic sensor to propagate from the tool through the electrolytic fluid to the workpiece and to reflect back to the ultrasonic sensor for use in calculating measurement of at least one of a group consisting of (a) size of the gap between said cutting surface of said tool and a first working surface of the workpiece facing said cutting surface, and (b) thickness of the workpiece between the first working surface of the workpiece and a second working surface thereof facing away from the first working surface.

10. The assembly of claim 9 further comprising:

an acoustic couplant between said ultrasonic sensor and said tool.

11. The assembly of claim 9 wherein said ultrasonic sensor comprises a contact transducer.

12. The assembly of claim 9 wherein said ultrasonic sensor comprises an immersion transducer.

* * * * *